United States Patent
Houser et al.

(10) Patent No.: US 7,816,883 B2
(45) Date of Patent: Oct. 19, 2010

(54) RETURN-TO-ZERO CONTROL METHOD FOR A STEPPER MOTOR

(75) Inventors: David B. Houser, Davison, MI (US); Lamar H. McLouth, Davison, MI (US); David J. Elliott, Linden, MI (US)

(73) Assignee: Delphi Technologies, Inc., Troy, MI (US)

( * ) Notice: Subject to any disclaimer, the term of this patent is extended or adjusted under 35 U.S.C. 154(b) by 461 days.

(21) Appl. No.: 11/973,632

(22) Filed: Oct. 9, 2007

(65) Prior Publication Data

US 2009/0091288 A1   Apr. 9, 2009

(51) Int. Cl.
*H02P 8/02* (2006.01)

(52) U.S. Cl. .................... 318/696; 318/560; 318/685; 318/434

(58) Field of Classification Search ............. 318/685, 318/696, 430, 432, 434, 437, 560, 256, 264, 318/266, 280
See application file for complete search history.

(56) References Cited

U.S. PATENT DOCUMENTS

| | | | |
|---|---|---|---|
| 5,665,897 A | | 9/1997 | Lippmann et al. |
| 5,994,893 A | * | 11/1999 | Maruyama et al. ......... 324/144 |
| 6,014,075 A | * | 1/2000 | Fujimori et al. ............ 340/461 |
| 6,677,723 B2 | * | 1/2004 | Shimazaki .................. 318/696 |
| 6,731,092 B2 | * | 5/2004 | Shimazaki .................. 318/685 |
| 6,771,038 B2 | * | 8/2004 | Fyfe ........................... 318/685 |
| 6,853,162 B2 | * | 2/2005 | Betts et al. .................. 318/696 |
| 6,956,351 B2 | * | 10/2005 | Yamada ...................... 318/685 |
| 7,129,670 B2 | * | 10/2006 | Oishi et al. ................. 318/685 |
| 7,145,309 B2 | * | 12/2006 | Reiter et al. ................ 318/696 |

* cited by examiner

*Primary Examiner*—Bentsu Ro
*Assistant Examiner*—Antony M Paul
(74) *Attorney, Agent, or Firm*—Jimmy L. Funke

(57) ABSTRACT

In a return-to-zero stepping sequence for a stepper motor that drives the pointer of a gauge, steps that could potentially cause the pointer to flutter are modified. At least the initial potential flutter step of the stepping sequence is divided into sub-steps to progressively attenuate the motor torque, the motor is deactivated during intermediate potential flutter steps, and at least the final potential flutter step of the stepping sequence is divided into sub-steps to progressively re-apply the motor torque.

11 Claims, 2 Drawing Sheets

| STEP | DURATION | COIL A | COIL B |
|---|---|---|---|
| 1 | 4 | ON − | ON − |
| 2 | 4 | OFF | ON − |
| 3 | 4 | ON + | ON − |
| 4 | 4 | ON + | OFF |
| 5 | 4 | ON + | ON + |
| 6 | 4 | OFF | ON + |
| 7 | 4 | ON − | ON + |
| 8 | 4 | ON − | OFF |

| STEP | DURATION | COIL A | COIL B |
|------|----------|--------|--------|
| 1 | 4 | ON − | ON − |
| 2 | 4 | OFF | ON − |
| 3 | 4 | ON + | ON − |
| 4a | 3 | ON + | OFF |
| 4b | 1 | OFF | OFF |
| 5 | 4 | OFF | OFF |
| 6 | 4 | OFF | OFF |
| 7a | 3 | OFF | OFF |
| 7b | 1 | ON − | ON + |
| 8 | 4 | ON − | OFF |

RETURN-TO-ZERO CONTROL METHOD FOR A STEPPER MOTOR

TECHNICAL FIELD

The present invention relates to an instrument cluster gauge having a pointer positioned by a stepper motor, and more particularly to a stepper motor control method for initializing the pointer to a designated zero position.

BACKGROUND OF THE INVENTION

Stepper motors have been used to drive analog gauge pointers, particularly in motor vehicle instrument clusters. Normal movement of the pointer is typically accomplished by microstepping the stepper motor, and the controller determines the relative pointer position by maintaining a step count. This eliminates the need for a position sensor, but requires a known initial position of the pointer. Since the pointer can be off-zero at power up, a return-to-zero half-step sequence is utilized at power-up to establish an initial zero position of the pointer. A typical return-to-zero step sequence involves driving the stepper motor through a specified angle of rotation in order to move the pointer against a fixed stop. Unfortunately, this can produce perceptible flutter of the pointer, and even audible noise, because certain steps of the return-to-zero sequence produce off-zero movement of a pointer that has already returned to the zero position. This phenomenon is described in some detail in the U.S. Pat. No. 5,665,897 to Lippmann et al., assigned to the assignee of the present invention, and incorporated herein by reference.

One way of addressing the pointer flutter issue is to simply deactivate the motor windings during the steps that might produce off-zero pointer movement. While such an approach can be simple to implement, the torque generated by the motor may be insufficient to reliably return the pointer to the rest position under certain conditions, and substantial errors can occur in gauges where the motor lacks a geartrain between its rotor and output shaft. The aforementioned Lippmann et al. patent discloses a reliable but more sophisticated approach involving a factory calibration learning procedure and a wake-up routine executed periodically during ignition off periods. What is needed is an improved return-to-zero control method that is both simple and reliable.

SUMMARY OF THE INVENTION

The present invention is directed to an improved return-to-zero control method for a stepper motor driven pointer of a gauge having a fixed stop corresponding to a known energization state of the motor. The control involves activating the stepper motor in accordance with a half-step return-to-zero stepping sequence in which steps that can potentially produce pointer flutter are modified in a way that progressively attenuates and then re-applies the torque produced by the motor. At least the initial potential flutter step of the stepping sequence is divided into sub-steps to progressively attenuate the motor torque, the motor is deactivated during intermediate potential flutter steps, and at least the final potential flutter step of the stepping sequence is divided into sub-steps to progressively re-apply the motor torque.

DESCRIPTION OF THE PREFERRED EMBODIMENT

Figures 1, 2:
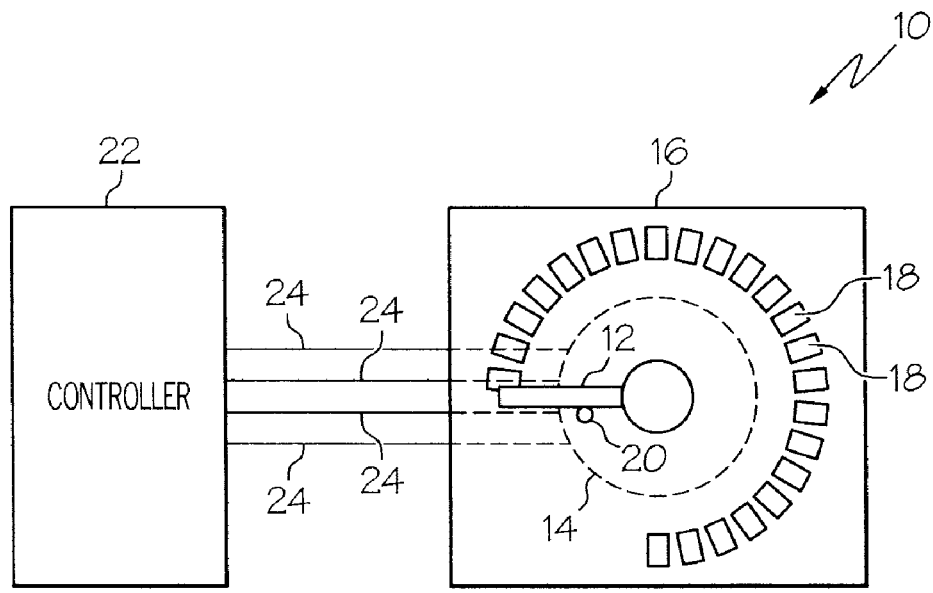
FIG. 1 is a diagram of a gauge including a pointer driven by a two-winding stepper motor and a microprocessor-based controller for carrying out a return-to-zero control method according to this invention.
FIG. 2 is a table depicting a conventional eight half-step return-to-zero stepping sequence for the stepper motor of FIG. 1.

Referring to FIG. 1, the reference numeral 10 generally designates an analog gauge assembly such as the speedometer or fuel gauge of a vehicle instrument cluster. The gauge assembly 10 includes a pointer 12 having a hub 12a affixed to the armature of a two-winding stepper motor 14, and a faceplate 16 featuring graphical indicia 18. Additionally, the gauge assembly 10 includes an internal or external stop 20 that defines a known position of pointer 12. A microprocessor-based controller 22 coupled to the stepper motor terminals 24 activates the windings of stepper motor 14 for positioning the pointer 12 to indicate a measured quantity such as speed or fuel level.

In the illustrated embodiment, the stepper motor 14 has a permanent magnet rotor and a stator wound with two coils, designated herein as Coil A and Coil B. An example of a suitable stepper motor is the PM20T stepper motor produced by NMB Technologies Corporation. A useful characteristic of that and other stepper motors is that the winding energization state for holding the pointer 12 at the rest or zero position can be known, whether by manufacturing design or post-manufacture testing. However, the initial position of the pointer 12 cannot be known for certain due to power interruptions and so forth, and the controller 22 will typically execute a return-to-zero stepping sequence at power-up for driving the pointer 12 against the stop 20.

The table of FIG. 2 depicts a conventional half-step return-to-zero stepping sequence for producing counter-clockwise rotation of pointer 12. Since there are two windings, a complete half-step sequence will entail eight different half steps (energization states), with the eighth step corresponding to the energization state that will hold or maintain the pointer 12 at the rest or zero position in abutment with stop 20. In the table, the duration column represents the step duration in milliseconds, and the Coil A and Coil B columns show the respective coil states (on/off) and current direction (+/−). The drawback of the depicted step sequence is that certain energization states of the sequence will produce clockwise rotation of the pointer 12 if the pointer 12 is already at the zero or rest position, possibly resulting in perceptible flutter and noise. Specifically, the undesired clockwise rotation can occur at steps 4, 5, 6 and 7 of the illustrated stepping sequence. For example, if pointer 12 is at the rest position, the fifth half-step of the sequence will produce clockwise torque to move the pointer 12 away from the rest position. For convenience, these potentially flutter causing steps are referred to herein as potential flutter steps.

Figures 3, 4:
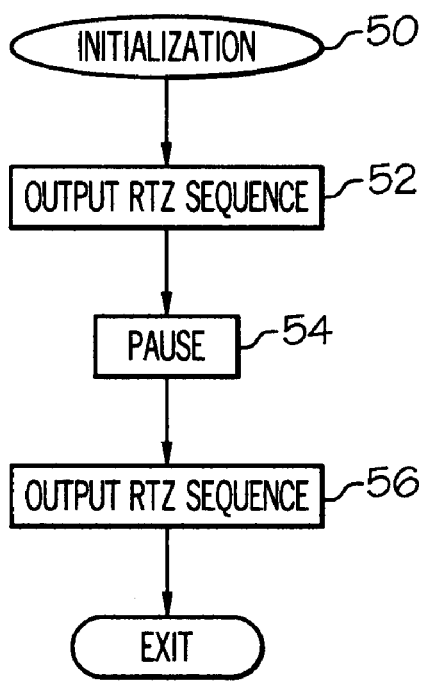
FIG. 3 is a table depicting a modified half-step return-to-zero stepping sequence for the stepper motor of FIG. 1 according to this invention.
FIG. 4 is a flow diagram of a routine executed by the microprocessor-based controller of FIG. 1 for carrying out the return-to-zero method of the present invention.

The table of FIG. 3 depicts a modified half-step sequence according to this invention. It differs from the conventional half-step sequence in two ways. First, stepper motor windings are both deactivated during the middle two of the four potential flutter steps (i.e., during steps 5 and 6). And second, the first and last of the four potential flutter steps (i.e., steps 4 and 7) are divided into sub-steps for reduced torque generation. Referring to FIG. 3, step 4 of the conventional step sequence is divided into sub-steps 4a and 4b, and step 7 of the conventional step sequence is divided into sub-steps 7a and 7b. Taken together, sub-steps 4a and 4b have a duration of 4 ms (i.e., the same as steps 1, 2 and 3), but both motor windings are deactivated during sub-step 4b. Similarly, sub-steps 7a and 7b taken together have a duration of 4 ms, but both motor windings are deactivated during sub-step. Generally speaking, breaking the first and last of the potential flutter steps into sub-steps of reduced torque generation progressively attenuates and then re-applies the torque produced by motor 14 to minimize the likelihood of perceivable flutter while ensuring that the motor 14 will produce sufficient torque to reliably move the pointer 12 to the rest position. It will be understood from FIG. 3 that in changing the coil states of motor coils A and B from the OFF states in sub-step 7a to the respective ON– and ON+ states in sub-step 7b, motor torque is progressively increased during the sequences of sub-steps 7a and 7b. Of course, more than just the first and last potential flutter steps can be sub-divided if desired. Also, the step durations shown in FIGS. 2 and 3 are only representative, and may vary depending on the pointer size, the motor torque characteristics, and other parameters.

Referring to FIG. 4, the initialization routine 50 is executed by controller 22 when power is initially applied to the gauge assembly 10, and the pointer position is completely unknown. The blocks 52, 54 and 56 are executed in order as shown to output the return-to-zero (RTZ) step sequence of FIG. 3, to pause for a prescribed interval to ensure pointer stabilization, and then to again output the return-to-zero step sequence of FIG. 3. This sequence can be repeated as necessary depending on the allowable range of pointer movement and the pointer movement that occurs for each activation of the step sequence. This ensures that the pointer 12 will be reliably returned to the rest or zero position even in cases where one complete step sequence is insufficient to ensure its full return.

In summary, the present invention provides a simple and cost effective control method for initializing a stepper motor driven pointer of a gauge assembly to a zero position. While the method has been described with respect to the illustrated embodiment, it is recognized that numerous modifications and variations in addition to those mentioned herein will occur to those skilled in the art. For example, the return-to-zero step sequence can be configured to produce clockwise pointer rotation instead of counter-clockwise rotation, the method can be applied to micro-stepping as well as half-stepping, and so forth. Accordingly, it is intended that the invention not be limited to the disclosed embodiment, but that it have the full scope permitted by the language of the following claims.

The invention claimed is:

1. A return-to-zero control method for a stepper motor coupled to drive a pointer of a gauge assembly including a stop corresponding to a known energization state of the stepper motor, the method comprising the steps of:
    defining a return-to-zero sequence of energization states for said stepper motor for driving said pointer toward said stop in a series of steps, terminating in said known energization state;
    identifying a series of steps in said return-to-zero sequence that could potentially drive said pointer away from said stop, and modifying the energization states for the identified series of steps by varying duration of activation and deactivation of said stepper motor during said identified series of steps in a manner to progressively attenuate and then re-apply a return-to-zero torque produced by the stepper motor; and
    applying the modified return-to-zero sequence of energization states to the stepper motor to drive said pointer toward said stop.

2. The return-to-zero control method of claim 1, including the steps of:
    dividing a first step of the identified series of steps into sub-steps of progressively reduced return-to-zero torque; and
    dividing a last step of the identified series of steps into sub-steps of progressively increased return-to-zero torque.

3. The return-to-zero control method of claim 2, including the step of:
    modifying the winding energization states for steps of the identified series of steps intermediate said first and last step so as to deactivate said stepper motor.

4. The return-to-zero control method of claim 2, where:
    said sub-steps of progressively reduced return-to-zero torque include a first sub-step of reduced duration compared to un-modified steps of said sequence and a second sub-step of stepper motor deactivation.

5. The return-to-zero control method of claim 2, where:
    said sub-steps of progressively increased return-to-zero torque include a first sub-step of stepper motor deactivation and a second sub-step of reduced duration compared to un-modified steps of said sequence.

6. A return-to-zero control method for a stepper motor coupled to drive a pointer of a gauge assembly including a stop corresponding to a known energization state of the stepper motor, the method comprising the steps of:
    defining a return-to-zero sequence of energization states for said stepper motor for driving said pointer toward said stop in a series of steps, terminating in said known energization state;
    identifying a series of steps in said return-to-zero sequence that could potentially drive said pointer away from said stop, and modifying the energization states for the identified series of steps in a manner to progressively attenuate and then re-apply a return-to-zero torque produced by the stepper motor;
    dividing a first step of the identified series of steps into sub-steps of progressively reduced return-to-zero torque;
    dividing a last step of the identified series of steps into sub-steps of progressively increased return-to-zero torque;
    modifying the winding energization states for steps of the identified series of steps intermediate said first and last step so as to deactivate said stepper motor; and
    applying the modified return-to-zero sequence of energization states to the stepper motor to drive said pointer toward said stop.

7. The return-to-zero control method of claim 6, where:
    said sub-steps of progressively reduced return-to-zero torque include a first sub-step of reduced duration compared to un-modified steps of said sequence and a second sub-step of stepper motor deactivation.

8. The return-to-zero control method of claim 6, where:
    said sub-steps of progressively increased return-to-zero torque include a first sub-step of stepper motor deactivation and a second sub-step of reduced duration compared to un-modified steps of said sequence.

9. A return-to-zero control method for a stepper motor coupled to drive a pointer of a gauge assembly including a stop corresponding to a known energization state of the stepper motor, the method comprising the steps of:
    defining a return-to-zero sequence of energization states for said stepper motor for driving said pointer toward said stop in a series of steps, terminating in said known energization state;

identifying a series of steps in said return-to-zero sequence that could potentially drive said pointer away from said stop, and modifying the energization states for the identified series of steps in a manner to progressively attenuate and then re-apply a return-to-zero torque produced by the stepper motor;

dividing a first step of the identified series of steps into sub-steps of progressively reduced return-to-zero torque;

dividing a last step of the identified series of steps into sub-steps of progressively increased return-to-zero torque;

applying the modified return-to-zero sequence of energization states to the stepper motor to drive said pointer toward said stop; and wherein said sub-steps of progressively reduced return-to-zero torque include a first sub-step of reduced duration compared to unmodified steps of said sequence and a second sub-step of stepper motor deactivation.

10. The return-to-zero control method of claim 9, including the step of:

modifying the winding energization states for steps of the identified series of steps intermediate said first and last step so as to deactivate said stepper motor.

11. The return-to-zero control method of claim 9, where:

said sub-steps of progressively increased return-to-zero torque include a first sub-step of stepper motor deactivation and a second sub-step of reduced duration compared to un-modified steps of said sequence.

* * * * *